United States Patent [19]

Regipa

[11] Patent Number: 4,696,444
[45] Date of Patent: Sep. 29, 1987

[54] DEVICE FOR COUPLING A BALLOON ENVELOPE WITH AN ELEMENT EXTERNAL TO THE ENVELOPE

[75] Inventor: Robert Regipa, Toulouse, France

[73] Assignee: Centre National d'Etudes Spatiales (C.N.E.S.), Paris, France

[21] Appl. No.: 853,446

[22] Filed: Apr. 18, 1986

[30] Foreign Application Priority Data

Apr. 25, 1985 [FR] France .................. 85 06465

[51] Int. Cl.$^4$ ............ B64B 1/40; B64B 1/50
[52] U.S. Cl. .................. 244/127; 244/31; 244/33
[58] Field of Search ............ 244/26, 30-33, 244/96-97, 126, 127, 128; 446/221, 225

[56] References Cited

U.S. PATENT DOCUMENTS

| | | | |
|---|---|---|---|
| 37,667 | 2/1863 | Shaw | 244/127 |
| 1,320,867 | 11/1919 | Kehler | 244/30 |
| 1,430,393 | 9/1922 | Lynde | 244/127 |
| 2,008,552 | 7/1935 | Jacobs | 446/221 |
| 2,919,083 | 12/1959 | Suomi et al. | 244/31 |
| 3,069,114 | 12/1962 | Maas | 244/31 |
| 3,218,756 | 11/1965 | Dragich | 446/221 |
| 3,456,903 | 7/1969 | Papst | 244/30 |

FOREIGN PATENT DOCUMENTS 683891 3/1965 Italy ................... 244/31

*Primary Examiner*—Galen Barefoot
*Attorney, Agent, or Firm*—Harold H. Dutton, Jr.

[57] ABSTRACT

A device for coupling a flexible envelope (1) to an external element including a ballonet (3) with two fasteners (4, 5) located in such a manner as to define the upper and lower poles of said ballonet, one of the fasteners (5) being linked by coupling members (2, 16) fitted to position the ballonet with respect to the envelope (1) in such a manner as to create a contact surface Z1 between said ballonet and the envelope (1), the second fastener (4) being linked to the external element by link means (8-15) including drive means to set the ballonet (3) in rotation; this device makes it possible to transmit large point forces or torques between an external element and an envelope, especially a space-balloon envelope.

11 Claims, 3 Drawing Figures

DEVICE FOR COUPLING A BALLOON ENVELOPE WITH AN ELEMENT EXTERNAL TO THE ENVELOPE

The invention relates to a device for coupling a flexible balloon envelope to an element which is external to the envelope. In particular it relates to a device for connecting the polar zone of a large-volume space balloon to an external structure for the purpose of transmitting forces or torques to this balloon.

BACKGROUND AND OBJECTS

The problems caused by large-volume aerostatic balloons capable of withstanding high overpressures while remaining of a relatively moderate weight, are presently being solved. Such balloons, for instance those described in French patent application No. 84.18798 by the same applicant, comprise of at least one inner envelope containing helium and one outer envelope containing both the inner envelopes and air which imparts its generally cylindrical shape to the balloon. The capability of the outer envelope to withstand high overpressures makes it possible to use such balloons as high-load transports, with the lifting of the load and the aerostatic vertical control being implemented by merely ballasting the air.

For operations where lifting is predominant, one application comprises an aerostatic lift device associated with a horizontal mechanical winch means. This device involves a captive balloon tethered to the ground at three fixed or automotive points. It may comprise a simple aerostatic balloon devoid of any means of its own for displacement, or it may also include, for lifting more substantial loads, an aerostatic machine comprising the combination of several balloons secured to external structures. Such an application moves large loads over short distances but is restricted in operations by the presence of cables and the need for a clear field.

This situation may be improved by implementing the horizontal winching of the device by the use of a separate aircraft that can be reduced to a point (helicopter or blimp). However these two applications require large tractions in order to achieve the horizontal winching by the balloons(s). These transverse forces are transmitted by the coupling means to the pole pieces of the balloons. Considering the small size of these pole pieces and the inertia of the assembly, the stresses applied to the envelope at the pole pieces, therefore, are quite high and may bring about the degradation and even the rupture of the connection between this envelope and the pole piece. The devices coupling the envelope and the horizontal winch means for an isolated balloon or the envelope and the external structure therefore must be carefully designed to permit transmitting high transverse forces.

Beyond those two applications, more ambitious projects combine aerostatic balloons into airships equipped with sets of horizontal propulsion plants and all means required to move bulky and high loads over long distances. Such airships require an aerodynamic design reducing the drag of the assembled balloons. This drag reduction may be achieved in significant manner by rotating these balloons about their longitudinal axis. This rotation also allows setting up artificial gravity. Considering the inertia of these balloons, rotation demands coupling them to external structures by means of devices allowing to transmission of large couples.

The object of the present invention is to provide a solution for the above discussed problems and to create a device coupling an envelope and an external element and allowing to transmit large forces to the envelope.

To that end, the main object of the invention is to have all or a great part of the envelope absorb the point stresses or torques transmitted in the vicinity of the pole of the envelope.

Another object of the invention is to create a coupling member which can act as damper between an envelope and an external element.

Still another object is to provide a coupling member capable of adapting itself to the differences in shape of an envelope subjected to variation in its inner overpressure.

DESCRIPTION OF THE INVENTION

The device forming the object of the invention to couple an envelope and an external element includes a ballonet made of flexible material and comprising two fasteners located at two opposite zones of the outer surface of the ballonet, means coupling the envelope and one of the ballonet fasteners which are designed to so position the ballonet as to create a contact surface between the ballonet and the external element, and link means on the external element for the other ballonet fastener.

In general the ballonet and the envelope have symmetry of revolution about an axis. In the present invention, the device is then characterized in that the ballonet fasteners are located on the axis of revolution in order to constitute the poles of the ballonet, and the coupling member is fitted to position the axis of revolution of the ballonet approximately in the extension of the axis of revolution of the envelope.

As will be better understood from the description below, a transverse force or torque applied to the external element will be transmitted through the ballonet at the contact surface between it and the envelope to this envelope. The area of this contact surface makes it possible to reduce the envelope stresses to values much lower than the shears it would be subjected to if the stress were transmitted directly at its axis of revolution. Also, the stress transmission by means of a contact surface away from the axis of revolution allows having a large part of the envelope absorb such a stress.

On the other hand, the stress transmission from the external element to the ballonet axis entails substantial stresses in the envelope of the ballonet. Accordingly this ballonet, which is small, may be economically made to be of high strength to secure it against any degradation, whereby it can withstand high overpressures so that the contact between this ballonet and the envelope is made more rigid.

Moreover, to reduce the stresses undergone by the ballonet, it includes another feature of the invention in the form of fasteners having symmetry of revolution about the ballonet axis of revolution and subtending different diameters in the plane orthogonal to the axis, the fastener linking the external element defining a larger diameter than that of the fastener connected to the envelope.

The diameter of the bigger fastener preferably is between one third and three-fourths of the diameter of the cross-section defined by the ballonet. These dimensions make it possible to transmit the forces by a large leverage whereby the ballonet stresses are reduced.

This device can be used to couple an envelope with a variable inner overpressure to an external element. In the present invention, the ballonet then includes control means for its inner overpressure for the purpose of changing the overpressure as a function of the magnitude of the force to be transmitted and of the contact stress between the ballonet and the envelope so as to maintain a suitable contact between the ballonet and the envelope.

Essentially, the properties of the contact surface between envelope and ballonet depend on one hand on the respective shapes of the ballonet and the envelope and on the other hand on the relative overpressures of this envelope and of this ballonet. These properties determine the magnitude of the force, torque or transverse force that the device may transmit to the envelope and therefore it is mandatory to adapt them to such forces or stress. Now for a given relative overpressure and envelope shape and a given force to be transmitted, there is a relative ballonet overpressure whereby a contact suitable to transmit this force can be implemented. Controlling this ballonet overpressure therefore allows maintaining an appropriate contact between envelope and ballonet for a given transmitted force.

In a preferred embodiment, the control means for the inner overpressure of the ballonet include a detector for the traction on the coupling means and means for regulating the ballonet overpressure in direct relation to that traction and to the external force transmitted to the envelope.

This is feasible because changing the envelope shape also changes the properties of the contact surface between the envelope and the ballonet and therefore changes the traction applied to the coupling members tending to decouple the two envelopes. Accordingly this traction representatively reflects the features of the contact surface and the detector matching the inner balloon overpressure as a direct function of this traction allows maintaining a suitable contact force for the transmission of the external forces to the envelope.

Other features, purposes and advantages of the invention will become clear from the description below with reference to the attached drawings showing an illustrative but non-limiting embodiment. These drawings are an integral part of the description.

DESCRIPTION OF THE PREFERRED EMBODIMENTS

Figure 1:
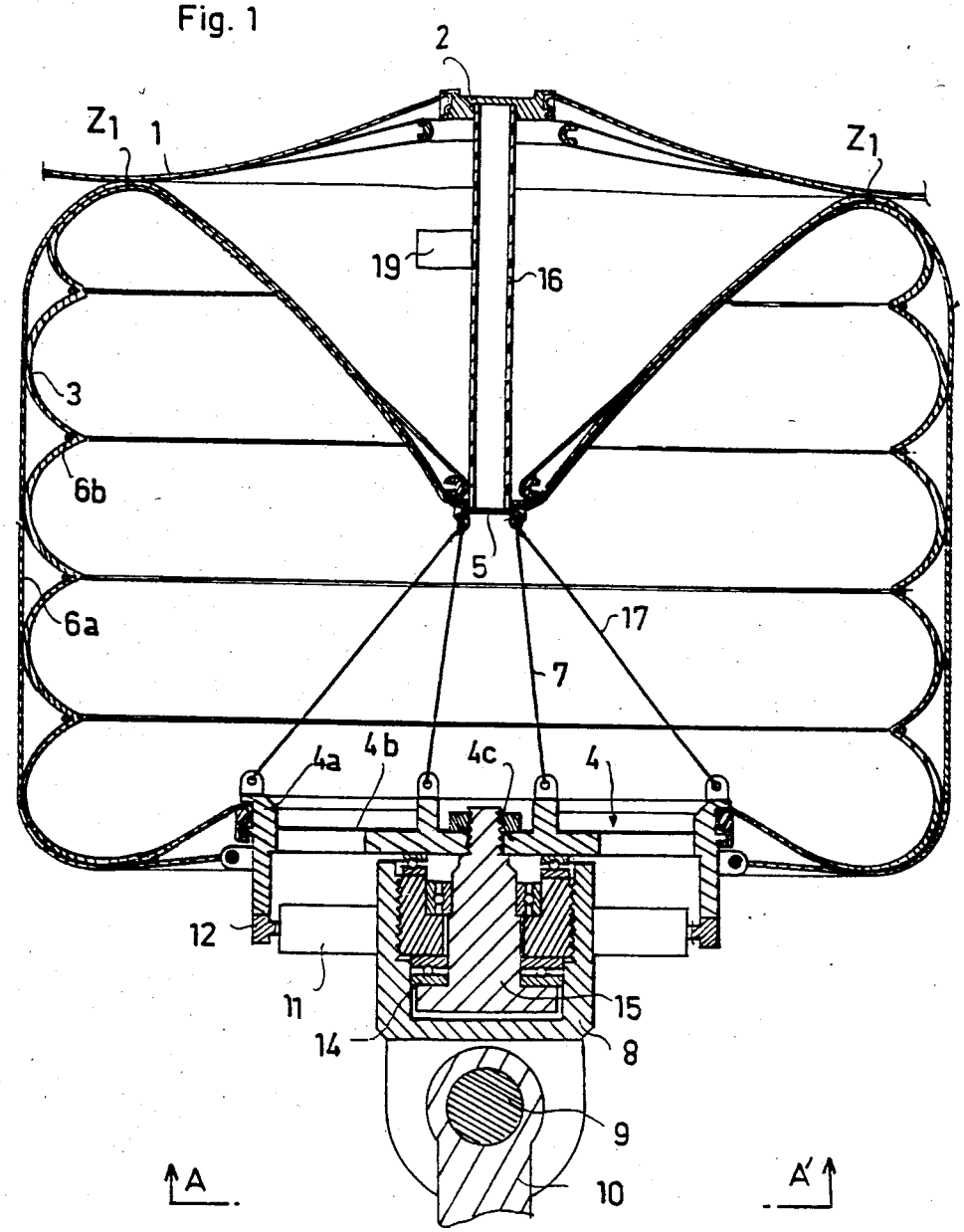
FIG. 1 is a longitudinal section through a coupling device of the invention.
Figure 2:
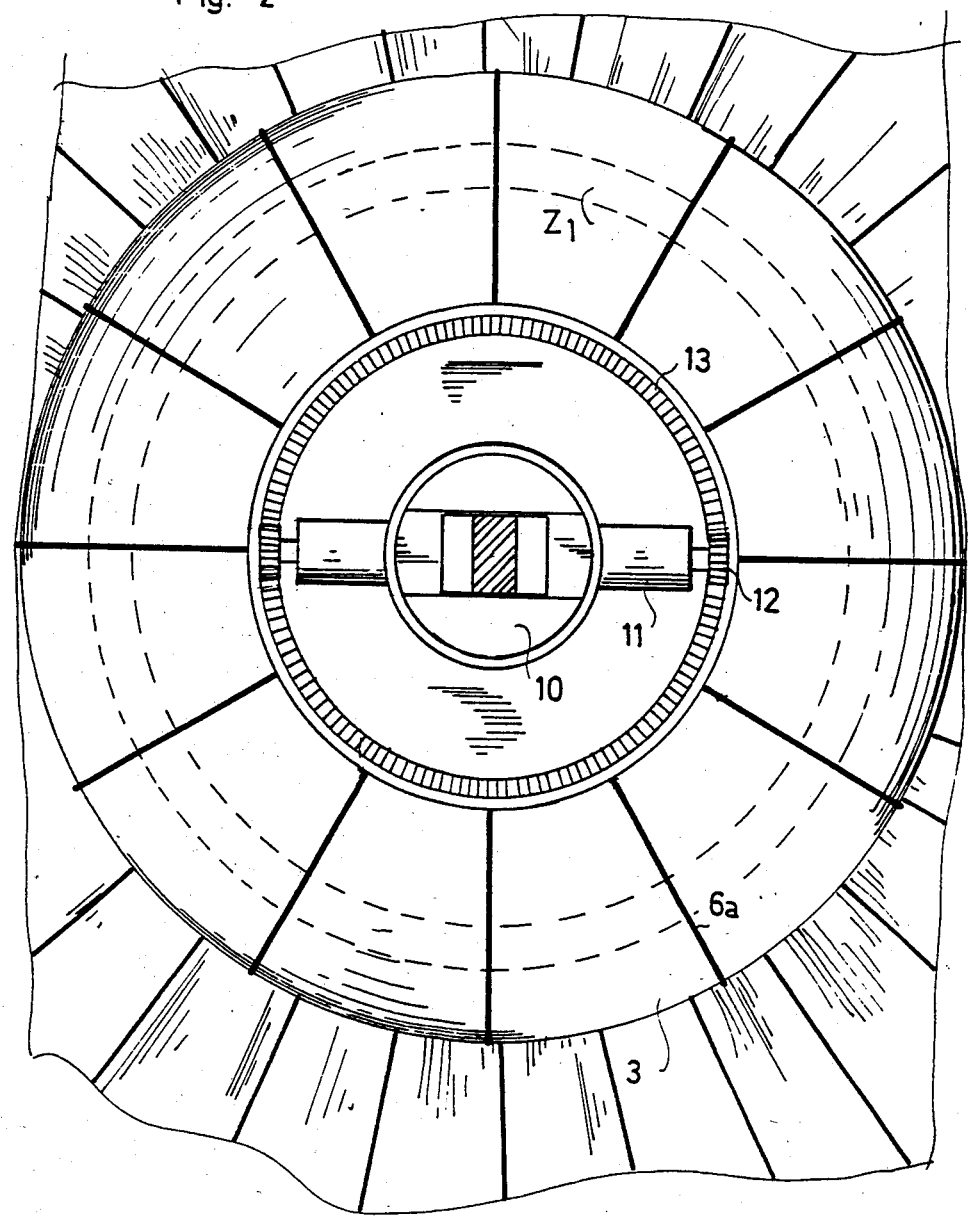
FIG. 2 is a section of this coupling device through the plane A—A'.

The coupling device illustratively shown in FIGS. 1 and 2 serves to couple an envelope and an external element located in the extension of the axis of this envelope. This device is particularly suitable to couple the polar zone of a space-balloon envelope of a generally cylindrical shape with an external element in the extension of the longitudinal axis of this balloon.

This balloon is illustratively described in French patent application No. 84.18798 and in particular comprises of an envelope 1 made of a flexible material with a high-strength, "Kevlar"-type longitudinal warp. The collapsed ends of this envelope are hooked to pole pieces 2 illustratively described in the recent French patent application No. 85.05674 of this applicant, which are located on the axis of this envelope and capable of absorbing substantial forces.

The coupling device comprises a ballonet in the form of an envelope having a cylindrical portion extending by collapsed end sections of which the edges are attached to pole pieces at the lower and upper poles of the envelope and on its axis.

The material comprising the envelope of the ballonet 3 is an airtight composite material with a "Kevlar"-based longitudinal warp. Also, this envelope is enclosed by a grid of longitudinal reinforcements such as 6a located in meridan planes distributed around the envelope and by a grid of circumferential reinforcements such as 6b located transversely along this envelope. The longitudinal reinforcements 6a are fastened near the ballonet poles to pole pieces 4 and 5 and the circumferential reinforcements 6b are fastened to the envelope of the ballonet 3 in such a manner that in its inflated state, each reinforcement makes contact with the envelope over the entire periphery. A harness of interpolar cables such as 7 which are lcoated within the envelope along its axis is also attached to the pole pieces. Both the longitudinal and transverse reinforcements and those cables are made of a "Kevlar" or similar fiber cable, and in combination with the intrinsic strength of the envelope impart high strenght to the ballonet.

The annular pole pieces 4 and 5 define the upper and lower poles of the ballonet and have different diameters. The larger diameter pole piece 4 comprise of an annular rim 4a with a groove to house and lock the envelope ends on its outer peripherial side. This rim 4a is stiffened in its transverse plane by at least one rigid disk 4b connecting the central core 4c of this pole piece to its periphery 4a.

Moreover this pole piece 4 is linked to drive means to set the ballonet in rotation. These drive means comprise an assembly 8 which is stationary with respect to the ballonet and connected by a hinge shaft 9 to a crank 10 rigidly fixed to an element external to the ballonet 3. Two drive motors such as 11 are mounted on this assembly 8 and drive into rotation two pinions such as 12 about a radial axis perpendicular to the ballonet longitudinal axis. These pinions 12 are designed to cooperate with a gear 13 solidly joined to the rim 4a of the pole piece 4 to drive this pole piece into rotation about the longitudinal ballonet axis.

The diameter of the pole piece 4 is approximately between one-third and three-fourths the diameter of the cross-section defined by the ballonet sheath and makes it possible when the ballonet is being driven into rotation to make use of all or of a large part of the envelope of said ballonet and to achieve large leverage allowing transmission of large torques.

Also, the assembly 8 by means of thrust ball bearings 14 touches an assembly means 15 which is mechanically linked to the central core 4c of the pole piece 4 and therby makes it possible to transmit large transverse forces to the ballonet.

The lesser-diameter pole piece 5 comprises of an annular piece as already described in Applicant's French application No. 85.05674. This pole piece is solidly joined to a coupling memeber 16 made of flexible material with high tensile strength and of which the other end will be fastened to the pole piece 2 of a large-volume balloon of the type discussed further below. This coupling member illustratively may comprises a "Kevlar"-type grid of cables.

This pole piece 5 is connected to the rim 4a of the pole piece 4 by a grid of high-tensile strength cables 17 of the Kevlar type. These cables make it possible to position the pole piece 4 in a stable manner, thereby inparticular avoiding tilting this piece 4 when transverse forces are transmitted tothe ballonet 3. Such a tilt would cause excessive tensions in the ballonet envelope where it is hooked to the pole piece 4 and whereby said ballonet envelope might be degraded.

Moreover, these cables 17 together with the harness of interpolar cables 7 facilitate the distance adjustment between the poles. In particular such an adjustment allows reducing this interpolar distance so as to keep the lesserdiameter pole piece 5 away from the collapsed part of the ballonet 3.

Lastly the pole piece 5 is provided with air intake and exhaust means at the ballonet 3. These means, not shown in the attached drawings, can be implemented by any presently known method. Illustratively they may comprise a three-way valve allowing either to evacuate air, or admit air from a turbocompressor or any other equivalent means.

The above described ballonet is initially inflated but without relative overpressure using a gas lighter than air, for instance helium, so as to make it self-transporting, and then it is filled by admitting air. This ballonet then is put in place by a tripod or any other known means opposite the polar zone of a large-volume aerostatic balloon. Then it is connected to the pole piece 2 of this balloon by the coupling member 16. In this position the bottom of the ballonet is in contact with polar zone of the balloon envelope 1. It should be noted that this contact surface Z1 is in the collapsed, and hence the stronger, part of the envelope.

The stiffening of the contact between the ballonet and the balloon at the contact Z1 is implemented by an additional air intake in the ballonet. In order to control the stresses between the envelopes at their contact surface Z1, the ballonet is provided with sensors 19 measuring the tension exerted on the coupling member 16. This force tending to uncouple the envelopes depends directly on the reaction at the contact surface Z1 and therefore depends on the inner relative overpressure of the ballonet. These sensors therefore control the ballonet air intakes and exhausts in order to achieve a suitable contact for the force to be transmitted to the envelope.

Furthermore, as the aerostatic balloon coupled to the ballonet is intended to make possible aerostatic control by variation of the gas masses, the inner relative overpressure and the shape of this balloon are therefore variable.

In order to maintain a suitable contact between the respective envelopes to allow force transmission in spite of the variations in the inner balloon overpressure, the control of the inner ballonet overpressure is achieved in relation to a reference value of the tension applied to the coupling member 16. This reference value is determined as a function of the various parameters relating to the forces to be transmitted to the envelope, to the inner relative pressures of the ballonet and of the envelope, etc.

This coupling between an aerostatic balloon and a ballonet 3 and acting as a damper therefore allows transmitting large forces or torques between an external element and an aerostatic balloon without danger of degrading said balloon. The diameter of the ballonet cross-section being approximately being one-fourth and one-third the diameter of the balloon cross-section, it is possible to transmit these forces through a contact surface remote from the longitudinal balloon axis. These forces torques or transverse stresses therefore are transmitted by a substantial leverage effect whereby the stresses are distributed over all or a great part of the balloon envelope. The small mechanical pole pieces therefore are protected the more the flexibility of the coupling member 16 will permit a slight offset between the axis of the two envelopes when for instance transverse stresses are being transmitted, in the absence of high shear stresses at the connection between the pole pieces 2 and 5 on one hand and the respective envelopes of the balloon and ballonet on the other.

Figure 3:
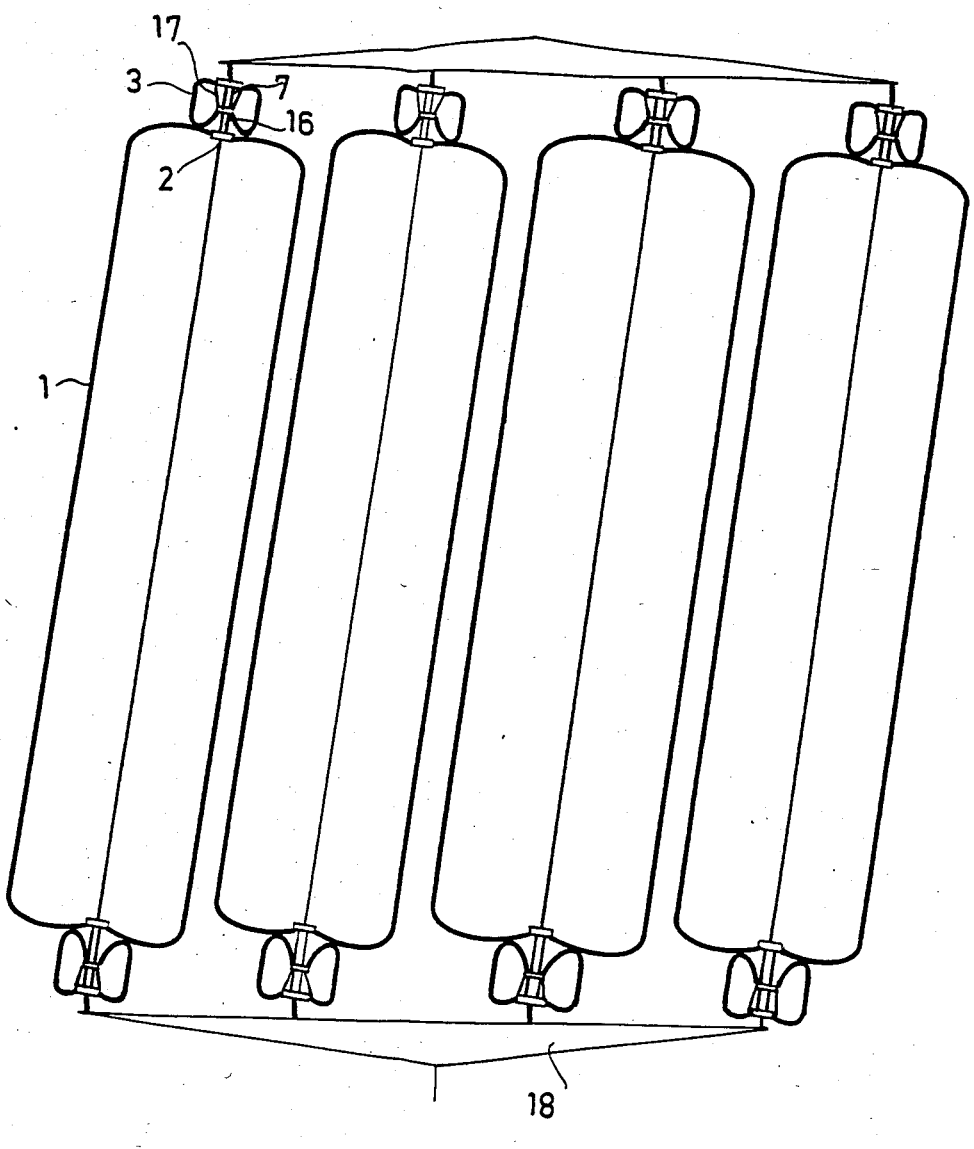
FIG. 3 is a schematic of a vertical axial section of an aerostatic assembly of balloons moored to the structure of this assembly by means of the coupling device.

This coupling ballonet may be used to couple an aerostatic balloon to any traction means making it possible to winch it horizontally. It may also be used to moor aerostatic balloons to lower and upper structures in order to achieve aerostatic airships such as shown in FIG. 3 by a combination of ballonet-balloon assemblies.

I claim:
1. A coupling device for coupling a flexible ballon envelope (1) having symmetry of revolution about an axis, with an external element, said device comprising:
   a ballonet (3) made of flexible material, having symmetry of revolution about an axis and having two fasteners (4, 5) located on the axis of revolution on two opposite zones of the surface of said ballonet, said fasteners (4, 5) being connected to a harness of high tensile-strength cables (7, 17) for providing their relative positioning, in a position where at least one of said fasteners (5) is kept away from the corresponding zone of the surface of said ballonet,
   means (2, 16) for coupling the envelope and one of said fasteners (5) of the ballonet (3), fitted to position the axis of revolution of said ballonet approximately in the extension of the axis of revolution of the envelope, so as to create a contact surface (Z1) between said ballonet (3) and said envelope, away from said axis of revolution, and
   link means (8–15) for connecting the other of said fasteners (4) of said ballonet (3) to the external element.

2. A coupling device as in claim 1 and wherein the diameter of the ballonet cross-section is essentially between one-fourth and one-third the diameter of the cross-section of the envelope (1).

3. A coupling device as in claim 1 and wherein the ballonet (3) includes fasteners (4, 5) having symmetry of revolution about the axis of revolution of the ballonet and defining different diameters in a plane which is orthogonal to said axis of revolution, the fastener (4) linked to the external element defining a diameter larger than the diameter of the fastener (5) linked to the envelope (1).

4. A coupling device as in claim 3, and wherein said ballonet (3) opposite the envelope is provided with a fastener (4) defining within a plane orthogonal to its axis of revolution a diameter which is approximately one-third to three-fourths the diameter of the cross-section of the ballonet (3).

5. A coupling device as in claim 1 and wherein the link means (8–15) include drive means (8, 11, 12, 13, 14, 15) to drive said ballonet (3) into rotation essentially about the ballonet axis of revolution.

6. A coupling device as in claim 1 and wherein the envelope (1) comprises a sheath of which the ends are joined together and fixed onto hook means (2) located on the axis of this envelope, said device being characterized in that the coupling means (2, 16) of the ballonet (3) and of the envelope (1) include a flexible and high tensile-strength coupling member (16) of which the ends are respectively fastened to a fastener (5) of the ballonet and to a hook means (2) of the envelope.

7. A coupling device as in claim 1 and wherein the ballonet (3) includes means for controlling its inner overpressure fitted to vary said overpressure as a function of the force to be transmitted to the envelope and of the contact stress between the ballonet and the envelope in order to maintain a suitable contact between said envelope and said ballonet.

8. A coupling device as in claim 7, and wherein the ballonet overpressure control means include a sensor (19) measuring the tension exerted on the coupling member (16) and means for regulating the overpressure of the ballonet in direct relation to said tension and to the external force to transmit to the envelope (1).

9. A coupling device as in claim 4 and wherein the ballonet (3) comprises a generally cylindrical sheath of which the ends are joined together and fixed onto pole pieces (4, 5) located on the longitudinal axis of said sheath and defining the upper and lower poles of said ballonet.

10. A coupling device as in claim 9, and wherein the ballonet (3) comprises a grid of longitudinal reinforcements (6a) made of a high tensile-strength material extending longitudinally along the ballonet and of which the ends are joined to the pole pieces (4, 5), and a grid of circumferential reinforcements (6b) made of a high tensile-strength material and extending transversely around the ballonet (3) in such a manner that in the inflated ballonet state, each circumferential reinforcement (6b) makes contact with this ballonet over its entire periphery.

11. A coupling device as in claim 10, and wherein
the upper pole of an envelope is linked to the lesser-diameter pole piece (5) of a ballonet (3),
the lower pole of said envelope is linked to the lesser-diameter pole piece (5) of a second ballonet, and
each ballonet is fixed by link means (8–15) to an external structure located in the extension of the axis of revolution of the ballonets-envelope assembly in order to constitute an aerostatic module.

* * * * *